United States Patent [19]

Feterl

[11] Patent Number: 5,351,568
[45] Date of Patent: Oct. 4, 1994

[54] ROTARY SPEED CHANGING APPARATUS

[75] Inventor: Leon G. Feterl, Salem, S. Dak.

[73] Assignee: Core Industries, Inc., Bloomfield Hills, Mich.

[21] Appl. No.: 33,828

[22] Filed: Mar. 19, 1993

[51] Int. Cl.⁵ .................. F16H 21/12; F16H 24/00
[52] U.S. Cl. ........................... 74/63; 74/116; 74/117
[58] Field of Search .................. 74/63, 116, 117, 118, 74/119

[56] References Cited

U.S. PATENT DOCUMENTS

| | | | |
|---|---|---|---|
| 1,929,058 | 10/1933 | Enard | 74/116 |
| 2,126,294 | 8/1938 | Timmermann | 74/117 X |
| 2,356,914 | 8/1944 | Blancha | 74/116 |
| 2,884,815 | 5/1959 | Pittman, Jr. | 475/180 |
| 3,258,994 | 7/1966 | Gorfin | 475/163 |
| 3,529,480 | 9/1970 | Kaspareck | 74/63 |
| 4,155,276 | 5/1979 | Fengler | 475/117 |
| 4,798,104 | 1/1989 | Chen et al. | 74/63 |
| 4,841,811 | 6/1989 | Bajulaz | 475/180 |
| 5,048,358 | 9/1991 | Shook | 74/117 X |

FOREIGN PATENT DOCUMENTS

| | | | |
|---|---|---|---|
| 40043 | 10/1924 | Norway | 74/63 |
| 481230 | 3/1938 | United Kingdom | 74/63 |

Primary Examiner—Rodney H. Bonck
Assistant Examiner—David W. Laub
Attorney, Agent, or Firm—Moore & Hansen

[57] ABSTRACT

There is provided by the present invention a speed changing apparatus having a housing mounting a plurality of inwardly directed, circumferentially disposed teeth, preferably in the form of a ring gear. The housing has a hub that rotatably receives at least a first shaft that in turn eccentrically mounts a plurality of elongate follower arms. Each follower ann is mounted at one end to the shaft with the other end having at least one tooth configured to engage the circumferentially disposed teeth. The housing further includes a base plate that is rigidly attached to the second shaft. Rotary motion is transferred between the first shaft and a second rotatable member by apparatus that includes a base pin that is rigidly attached to the base plate, an arm pin rigidly attached to a follower ann and a linking ann pivotally attached at opposite ends to the base pin and the arm pin. The second rotatable member may be a second shaft, the housing, or the base plate.

5 Claims, 3 Drawing Sheets

ROTARY SPEED CHANGING APPARATUS

The present invention relates generally to apparatus useful in changing rotational speeds between a power input and a power output. In particular, the present invention relates to a rotary speed changer of the gear type for effecting reductions in speed between input and output shafts of the speed changer.

BACKGROUND OF THE PRESENT INVENTION

The prior art contains numerous examples of rotary type speed changing devices. Among these prior art examples are U.S. Pat. No. 2,884,815 to Pittman, Jr., which teaches a speech changer of the gear assembly type characterized in that the ratio of the input rotational speed to the output rotational speed is high and in which the number of stages of speed reduction can be changed by changing the axial length of the assembly; U.S. Pat. No. 3,529,480 to Kaspareck, which teaches an incremental or stepping drive that has a high torque capacity; U.S. Pat. No. 4,155,276 to Fengler, which teaches a two stage speed reducing transmission for use primarily in the gas turbine engine field to reduce the high rotational speed of the turbine rotor for other uses; U.S. Pat. No. 4,798,104 to Chen et al., which teaches a speed changer of the oscillatory tooth and needle gear transmitting type; and U.S. Pat. No. 4,841,811 to Bajulaz, which teaches a mechanical speed reducer that has a small angular definition between the input and output shafts and includes two reduction members that are coaxial with the driven and driving members and that are angularly displaceable with respect to each other.

Many of the prior art devices, such as Pittman and Kaspareck rely upon a pivotal movement of a pin within a slot in order to achieve the relative rotational movement between driven and driving members. Consequently, these devices are subject to a great deal of wear in these particular areas as well as known wear areas such as the intermeshing teeth. Consequently, it would be desirable to have a speed changer of the gear type that did not rely upon the prior art pin/slot type of apparatus for the relative rotational difference between the driven and driving members.

SUMMARY OF THE PRESENT INVENTION

It is an object of the present invention to provide new and improved apparatus that is not subject to the foregoing disadvantages.

More particularly, it is an object of the present invention to provide and new and improved speed changer of the gear type that is subject to less wear and that does not utilize the pin/slot arrangement of prior art speed changers.

There is provided by the present invention a speed changing apparatus having a housing mounting a plurality of inwardly directed, circumferentially disposed teeth, preferably in the form of a ring gear. The housing has a hub that rotatably receives a shaft that in turn eccentrically mounts a plurality of elongate follower arms. Each follower arm is mounted at one end to the shaft with the other end having at least one tooth configured to engage the circumferentially disposed teeth. The housing further includes a second hub that receives a second shaft, both the first and second shafts being concentric with the circumferentially disposed teeth, and a base plate that is rigidly attached to tile second shaft. Rotary motion is transferred between the first and second shafts by a lost motion apparatus that includes a base pin that is rigidly attached to the base plate, an ann pin rigidly attached to a follower ann and a linking arm pivotally attached at opposite ends to the base pin and the ann pin.

In another embodiment, the present invention has a disk-shaped housing mounting an internal ring gear and a hub concentric with tile ring gear. The hub rotatably receives a sleeve that is attached to a base plate. The sleeve, in turn, rotatably receives a shaft that eccentrically mounts a plurality of follower arms. The base plate may be anchored such that the housing is rotatable with respect thereto, thus allowing an endless belt, chain, track, or the like to engage the outer circumferential surface of the housing to take power from the shaft or supply power to the shaft through the lost motion apparatus previous described.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE PRESENT INVENTION

Figures 1, 2:
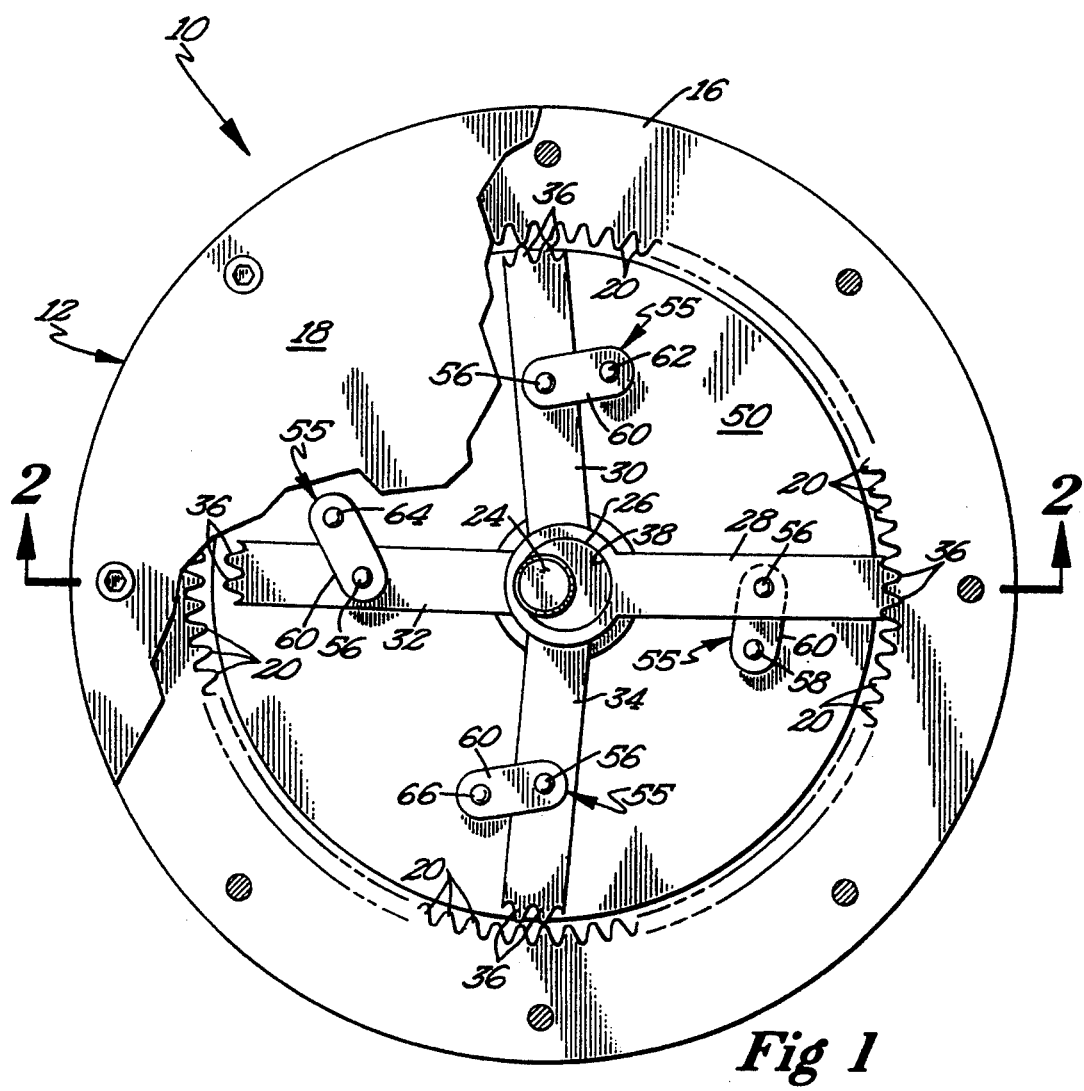
FIG. 1 shows in a top plan view an embodiment of a speed changer in accordance with the present invention with the cover plate partially removed.
FIG. 2 shows a partial cross sectional view of the speed changer shown in FIG. 1 taken along cutting plane 2—2 thereof.

FIGS. 1 and 2 illustrate an embodiment of the present invention wherein a rotary speed changing apparatus 10 includes a housing 12 having a back wall 14, at least one side wall 16, and a front wall or cover plate 18. In most applications of the present invention, the housing 12 will have a substantially disk-like configuration with a singular circular side wall 16. The present invention may find use with other than an outer disk-like configuration and such are included within the scope of the present invention. Housing 12 includes therein a plurality of inwardly directed circumferentially disposed gear teeth 20, preferably integrally formed on the interior of housing 12. Teeth 20 may also take the form of a ring gear rigidly attached to the interior of housing 12. Cover plate 18 includes a bore or bearing aperture 22 that rotatably receives a first shaft 24 having a first axis of rotation 23. First shaft 24 includes an eccentric lobe 26. A plurality of elongate follower arms, here arms 28, 30, 32 and 34, are eccentrically mounted to shaft 24 and are preferably spaced equidistantly thereareound. Preferably, though not required by the present invention, each follower ann 28–34 will be substantially identical to each of the other follower arms. Each elongate ann 28-34 is mounted at one end thereof to shaft 24 so as to engage lobe 26. The other end of each ann 28-34 includes at least one tooth 36 for engagement with circumferentially disposed teeth 20. Each follower ann includes a substantially circular bore 38 that mountingly receives eccentric lobe 26. The follower arms 28-34 are stacked such that each arm lies in its own plane, each plane being substantially parallel to each of the other planes in which the other follower arms lie. The arms 28-34 are separated from each other by low friction bushings 40 for reducing wear on the arms. Similarly, a larger, collar-type of bushing 42 separates cover plate 18 from first shaft 24 and from arm 28.

Apparatus 10 further includes a second shaft 44 having a second axis of rotation 45. First and second axes of rotation 25 and 45 of first and second shafts 24 and 44, respectively, are substantially coincident. Second shaft 44 extends into housing 12 through a bore 46 of a sleeve 48 integrally attached to back wall 14. A base plate 50 is rigidly joined to second shaft 44, which includes a receptacle 52 at the inner end thereof that concentrically receives the inner end 53 of first shaft 24 so as to position the first and second shafts 24 and 44 concentrically relative to each other and the gear teeth 20. As shown, base plate 50 has a substantially circular configuration, though such is not required by the present invention. Base plate 50 is advantageously spaced from the inner surface of the back wall 14 by a low friction bushing 54 that acts to reduce the frictional wear that could otherwise be expected to occur as a result of the frictional interaction between back wall 14 and base plate 50.

Each ann 28-34 is connected to base plate 50 by a lost motion apparatus 55 including a base pin that is attached to the base plate 50, an ann pin attached to the arm, and a link that is pivotally attached at its opposite ends to and extends between the base pin and the ann pin. For example, as best seen in FIG. 2, ann 28 is attached to base plate 50 by means of an ann pin 56, a base pin 58 and a link 60 that extends between the ann pin 56 and the base pin 58. While the arm pin 56 and the link 60 are substantially identical for each ann 28-34, the base pin 58 for each ann will differ from arm to ann in its length. That is, base pin 58 will be longer than base pin 62, which is associated with ann 30; base pin 62 will be longer than base pin 64, which is associated with ann 32; and base pin 64 will be longer than base pin 66, which is associated with arm 34. For example, as seen in FIG. 2, base pin 64, which forms part of the connecting link between ann 32 and base plate 50 is shorter than base pin 58. The general structure of the apparatus 10 shown in FIG. 1 and 2 having now been shown and described, its operation will now be described with reference to FIGS. 3-7.

Figure 3:
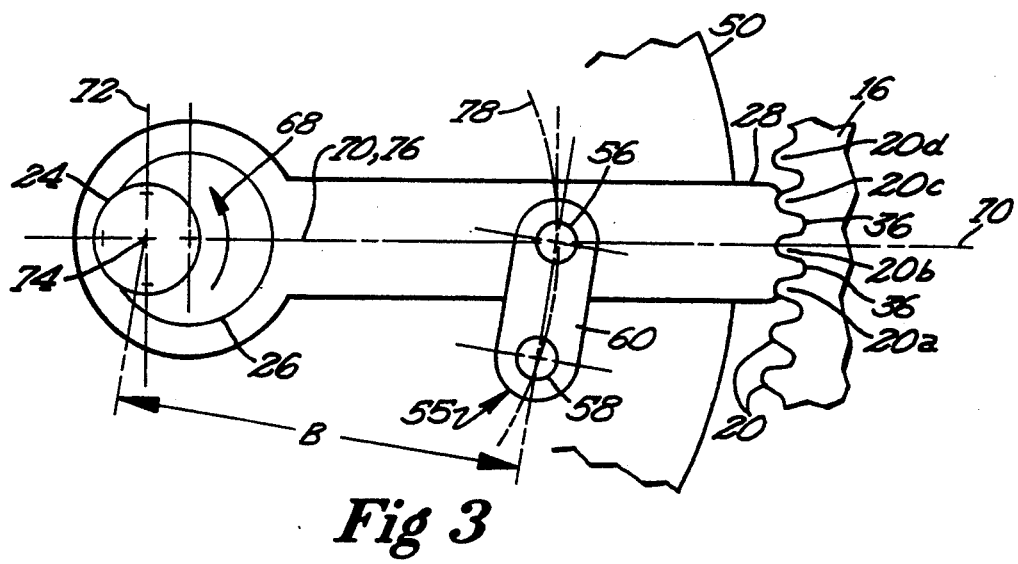
FIG. 3-7 illustrate in partial top plan views the movement of an arm in response to the 90° rotation of the input shaft shown in FIGS. 1 and 2 and the consequent engagement and disengagement of the teeth on the follower ann with the internally directed teeth attached to the housing.
Figure 6:
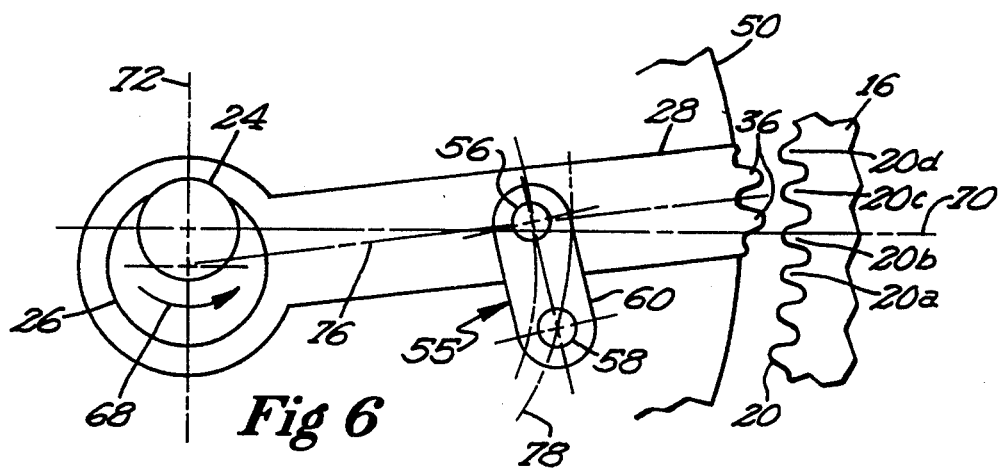
Figure 7:
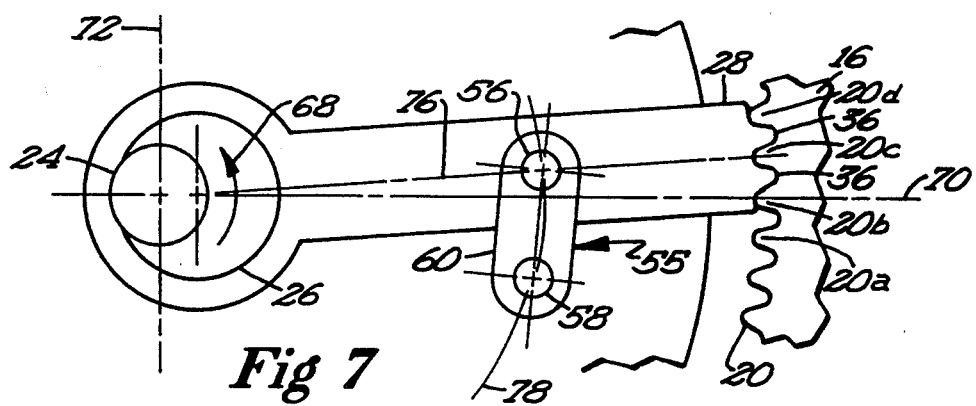

FIGS. 3 through 6 show a partial top plan view of the apparatus shown in FIGS. 1 and 2 wherein eccentric lobe 26 and ann 28 are shown in successive positions as the eccentric lobe 26 moves through successive quarter rotations, that is, through successive 90° angles of rotation the rotation being indicated by arrow 68. Thus, FIG. 4 differs from FIG. 3 in that eccentric lobe 26 and thus first shaft 24 have each rotated 90° counter-clockwise. Likewise, FIG. 5 differs from FIG. 4 in that lobe 26 and first shaft 24 have rotated 90° counterclockwise with respect to their respective positions shown in FIG. 4. FIG. 6 shows eccentric lobe 26 and first shaft 24 having rotated 90° counter-clockwise with respect to FIG. 5, and thus 270° with respect to FIG. 3. FIG. 7, meanwhile, shows eccentric lobe 26 and first shaft 24 having rotated slightly more than 90° counter-clockwise with respect to FIG. 6 such that eccentric lobe 26 has rotary slightly more than 360° relative to its position shown in FIG. 3, that is, slightly more than a complete revolution. As a result of this complete revolution of eccentric lobe 26, ann 28, which is shown in FIG. 3 engaging teeth 20, and in particular teeth 20a, 20b, and 20c, has disengaged from its engage position with teeth 20a, 20b, and 20c, has rotated slightly counterclockwise, and has reengaged the outer ring gear such that teeth 20b, 20c and 20d are now engage. That is, ann 28 has advanced the equivalent of one tooth around the circumference.

To further clarify the movements of the arms 28-34 during the rotation of first shaft 24, a horizontal axis 70 and an intersecting vertical axis 72 disposed at a right angle to axis 70 have been designate. Axis 70 and 72 intersect: at the center 74 of first shaft 24. As shown in FIGS. 3-7 then, horizontal axis 70 bisects tooth 20b. Arm 28 can be defined in pan by a longitudinally extending symmetry axis 76. Axis 76 is coincident with axis 70 as seen in FIG. 3, but the angular relationship between axes 70 and 76 varies as first shaft 24 rotates. Base pin 58 is fixed to base plate 50 at an end thereof. Because base plate 50 is rigidly attached to second shaft 44, which in turn is concentric with first shaft 24, base pin 58 is always a constant distance B away from the center 74 of first shaft 24. Thus, base pin 58, and therefore base pins 60, 62, and 64, will travel in a circle 78 about center 74 as first shaft 24 rotates. Ann pin 56, however, is fixed to the follower arms and therefore follows a circular path having a reciprocating, oscillatory perturbation imposed thereon.

Figure 4:
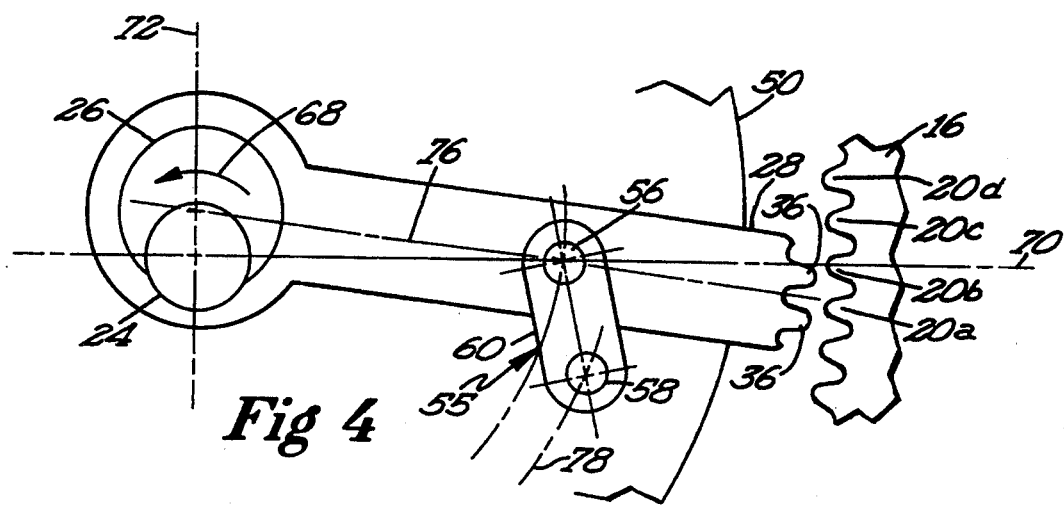
Figure 5:
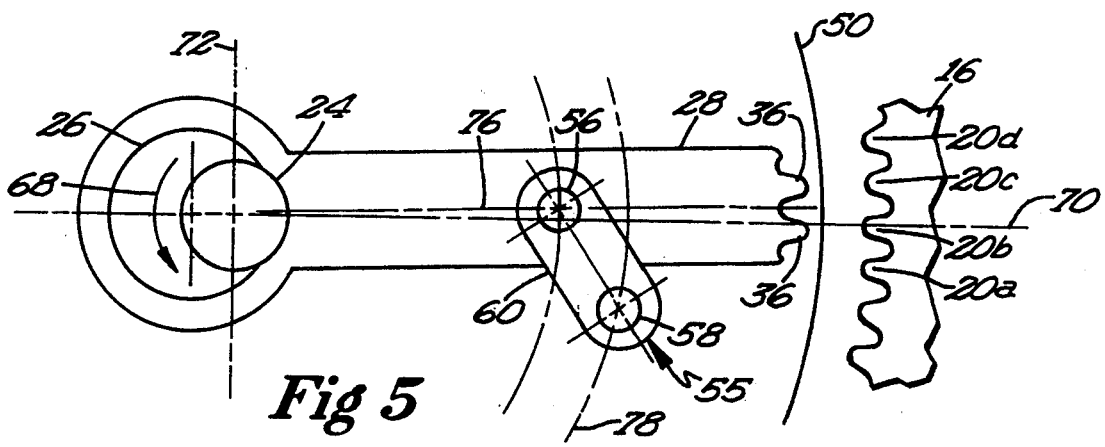

That is, as first shaft 24 rotates through the one quarter rotation shown in FIGS. 3 and 4, eccentric lobe 26 also rotates one quarter of a rotation, beginning the disengagement of follower ann 28 and follower ann teeth 26 from teeth 20a-c. As shown in the motion of ann 28 between FIGS. 4 and 5, lobe 26 has rotated an additional quarter turn or 90° counter-clockwise so as to complete the disengagement of teeth 36 from circumferential teeth 20a-c. Ann pin 56 has been pulled away from circumferential teeth 20 towards shaft 24 and lobe 26 and has rotated counterclockwise approximately half the radial distance of one tooth. As the complete 360° rotation of the shaft 24 and lobe 26 is completed in FIGS. 6 and 7, follower ann 28 has been moved towards circumferential teeth 20 so as to engage teeth 20b-d. Ann pin 56 is shown as having moved circumferentially a radial distance of one circumferential gear tooth from its position in FIG. 3. This slight rotation of the ann pin 56 rotationally pulls on link 60, which through its attachment to base pin 58 rotationally pulls on base plate 50 thereby causing the base plate 50 to rotate. Because of the fixed attachment between base plate 50 and second shaft 44, second shaft 44 is pulled rotationally by the imparted rotational movement of base plate 50.

In the aforedescribed manner rotational movement is transferred between first and second shafts 24 and 44 respectively with a reduction in speed from the first to the second shaft. That is, as shown in FIGS. 3-7, first shaft 24 has rotated once while second shaft 44 has rotated the equivalent of one circumferential gear tooth. The actual change in relative speeds between the first and second shafts 24 and 44 will depend upon the length of the follower ann 28 and the number of circumferential gear teeth 20. Of course, the aforementioned description presumed that first shaft 24 was the power input and second shaft 44 was the power output. These roles could be reversed if a relative speed increase between the shafts were desired. Thus, second shaft 44 could serve as the power input source and first shaft 24 could be the power output.

Figure 8:
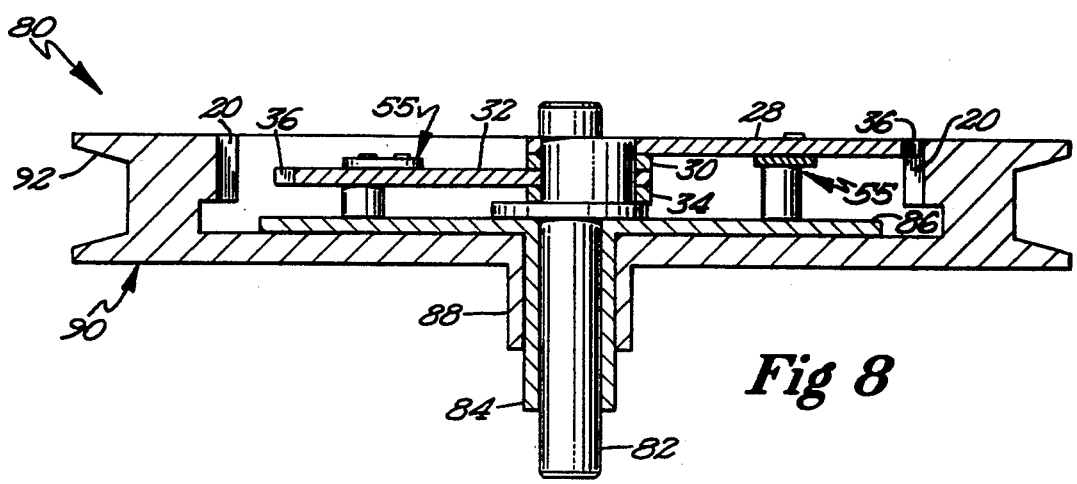
FIG. 8 shows another embodiment of the present invention wherein power may be taken off the extenml surface of the housing or the sleeve surrounding the input shaft.

FIG. 8 shows another embodiment 80 of the present invention utilizing only a single shaft 82. Shaft 82 is received within a sleeve 84 integral with a base plate 86. Sleeve 84 is in turn received within a hub 88 of a housing 90. Housing 90 may include an outer circumferential stirface 92 configured for use with a chain or belt. In other respects, embodiment 80 is similar to the embodiment shown in FIGS. 1-7. In the embodiment shown in FIG. 8, base plate 86 may be affixed to shaft 82 so that as shaft 82 rotates so does base plate 86. In this way rotation is transferred from the shaft 82 to the housing 90 through the previously described linkage assembly of base pin member, link member, ann pin member and follower ann. Rotation of the housing enables power output through a chain or belt engaging outer circumferential surface 92 of housing 90. Outer stirface 92 can thus include a plurality of gear teeth to engage a chain or have a smooth surface to engage an endless belt. Like the previously described embodiment of FIG. 1, the power transfer could be reversed with the housing outer surface 92 serving as the power input and power output being taken from shaft 82.

Alternatively, in the embodiment shown in FIG. 8, shaft 82 could be free to rotate within sleeve 84 and housing 90 could be fixed so as to not be rotatable. In this embodiment the power transfer would occur between shaft 82 and base plate 86 such that sleeve 84 would rotate and power could be transferred between shaft 82 and sleeve 84.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

I claim:

1. A rotary speed changing apparatus comprising:
 a first rotatable shaft having a first axis of rotation;
 a second rotatable shaft having a second axis of rotation;
 a housing, said housing including a first and a second hub, said first hub rotatably receiving said first shaft and said second hub rotatably receiving said second shaft so that said first and second axes of rotation are substantially coincident; and
 a power transfer assembly for transferring rotary power between said first and second shafts and for changing the speed of rotation between said first and second shafts so that said first and second shafts rotate at different speeds, said assembly comprising:
  a plurality of inwardly directed, circumferentially disposed teeth members mounted within said housing concentrically with and about said first and second shafts;
  a plurality of follower arms eccentrically mounted to said first shaft for substantially radial reciprocation into engagement with and disengagement from said circumferential teeth members, said arms extending outwardly from said first shaft toward said plurality of teeth members, each said arm including at least one tooth for reciprocal toothed engagement with said plurality of circumferential teeth members as said first shaft rotates, wherein said plurality of follower arms are each disposed in individual planes, said planes being substantially parallel with each other;
  a base plate, said base plate rigidly attached to said second shaft; and
  means for transferring rotary motion from each said follower arm to said base plate, said means extending between said base plate and each said follower arm and comprising:
   a base pin member rigidly attached to said base;
   an arm pin member attached to an arm; and
   a linking arm extending between said base pin member and said arm pin member and being pivotally attached at opposing ends to said base pin member and said arm pin member;
 whereby rotation of said first shaft causes said teeth of said follower arms to reciprocally engage said circumferential teeth members, said engagement imparting rotary motion to said arm pin member which is transferred to said base pin member by said linking arm, said rotary motion of said base pin member being transferred to said base plate, thereby causing said second shaft to rotate a rotational speed different from said first shaft.

2. The apparatus of claim 1 wherein said plurality of follower arms in an even number and said arms are substantially equally spaced about said first shaft.

3. The apparatus of claim 1 wherein said plurality of follower arms in an even number and said follower arms are substantially equally spaced in a circumferential direction.

4. A rotary speed changing apparatus comprising:
 a housing;
 a power input into said housing;
 a power output from said housing; and
 a power transfer assembly for transferring rotary power between said power input and said power output and for changing the speed of rotation between said power input and said power output, said assembly comprising:
  a plurality of inwardly directed, circumferentially disposed teeth members mounted within said housing;
  a plurality of follower arms eccentrically mounted within said housing for substantially radial reciprocation into engagement with and disengagement from said circumferential teeth members, said arms extending toward said plurality of teeth members, each said arm including at least one tooth for reciprocal toothed engagement with said plurality of circumferential teeth members, wherein said plurality of follower arms are disposed in a plurality of planes, said planes being substantially parallel with each other;
  a base plate, said base plate rigidly attached to said power output; and
  means for transferring rotary motion from each said follower arm to said base plate, said means extending between said base and each said follower arm and comprising:
   a base pin member rigidly attached to said base;
   an arm pin member attached to an arm; and
   a linking arm extending between said base pin member and said arm pin member and being pivotally attached at opposing ends to said base pin member and said arm pin member;
 whereby rotation of said power input causes said teeth of said follower arms to reciprocally engage said circumferential teeth members, said engagement imparting rotary motion to said arm pin member which is transferred to said base pin member by said linking arm, said rotary motion of said base pin member being transferred to said base plate, thereby causing said power output to rotate at a rotational speed different from said power input.

5. A rotary speed changing apparatus comprising:

a first rotatable shaft having a first axis of rotation;

a second rotatable shaft having a second axis of rotation;

a housing, said housing including a first and a second hub, said first hub rotatably receiving said first shaft and said second hub rotatably receiving said second shaft so that said first and second axes of rotation are substantially coincident; and a power transfer assembly for transferring rotary power between said first and second shafts and for changing the speed of rotation between said first and second shafts so that said first and second shafts rotate at different speeds, said assembly comprising:

a plurality of inwardly directed, circumferentially disposed teeth members mounted within said housing concentrically with and about said first and second shafts;

a plurality of follower arms eccentrically mounted to said first shaft for substantially radial reciprocation into engagement with and disengagement from said circumferential teeth members, said arms extending outwardly from said first shaft toward said plurality of teeth members, each said arm including at least one tooth for reciprocal toothed engagement with said plurality of circumferential teeth members as said first shaft rotates, wherein said plurality of follower arms are each disposed in individual planes, said planes being substantially parallel with each other;

a base plate, said base plate rigidly attached to said second shaft; and means for transferring rotary motion from each said follower arm to said base plate, said means extending between said base plate and each said follower arm;

whereby rotation of said first shaft causes said teeth of said follower arms to reciprocally engage said circumferential teeth members, said engagement imparting rotary motion to said base plate by said means for transferring rotary motion, thereby causing said second shaft to rotate at a rotational speed different from said first shaft.

* * * * *

UNITED STATES PATENT AND TRADEMARK OFFICE
CERTIFICATE OF CORRECTION

PATENT NO. : 5,351,568

DATED : October 4, 1994

INVENTOR(S) : Feterl

It is certified that error appears in the above-identified patent and that said Letters Patent is hereby corrected as shown below:

In ABSTRACT: line 7, before "follower," delete "ann" and substitute --arm--therefor.

line 15, before "follower," and "linking" delete "ann" and substitute --arm--therefor.

col. 1, line 61, before "follower," delete "ann" and substitute --arm--therefor.

col. 1, line 67, before "to," delete "tile".

col. 2, line 3, before "follower," delete "ann" and substitiute --arm--therefor.

col. 2, line 5, before "pin and the," delete "ann" and substitute --arm--therefor.

col. 2, line 66, before "follower," delete "ann" and substitute --arm--therefor.

col. 2, line 67, before "elongate," delete "ann" and substitute --arm--therefor.

col. 3, line 3, before "follower," delete "ann" and substitute --arm--therefor.

col. 3, line 31, before "Each," delete "ann" and substitute --arm--therefor.

col. 3, line 3, before "50, an" delete "ann" and substitute --arm--therefor.

UNITED STATES PATENT AND TRADEMARK OFFICE
CERTIFICATE OF CORRECTION

PATENT NO. : 5,351,568

DATED : October 4, 1994

INVENTOR(S) : Feterl

It is certified that error appears in the above-indentified patent and that said Letters Patent is hereby corrected as shown below:

col. 3, line 36, before "Fig. 2," delete "ann" and substitute --arm--therefor.

col.3, line 37, before "means of an," delete "ann" and substitute --arm--therefor.

col. 5, line 38, before "between the," delete "ann" and substitute --arm--therefor.

col.3, line 40, before "each," delete "ann" and substitute --arm--therefor.

col. 3, line 41, before "arm to," delete "ann" and substitute --arm--therefor.

col. 3, line 44, before "associated with," delete "ann" and substitute --arm--therefor.

col. 4, line 5, before "lobe 26," delete "ann" and substitute --arm--therefor.

col. 4, line 10, before "now," delete "engage" and substitute --engaged therfor.

col. 4, line 10, before "That is," delete "ann" and substitute --arm--therefor.

col.4, line 19, before "defined in," delete "pan" and substitute --part--therefor.

col. 4, line 29, before "rotates." delete "Ann" and substitue --Arm--therefor.

UNITED STATES PATENT AND TRADEMARK OFFICE
CERTIFICATE OF CORRECTION

PATENT NO.  : 5,351,568
DATED       : October 4, 1994
INVENTOR(S) : Feterl

It is certified that error appears in the above-indentified patent and that said Letters Patent is hereby corrected as shown below:

In DETAILED DESCRIPTION OF THE PRESENT INVENTION: col.4, line 36, before "follower," and "28 and follower," delete "ann" and substitute --arm-- therefor.

col. 4, line 38, before "motion of," delete "ann" and substitute --arm--therefor.

col. 4, line 41, before "teeth 20a-c." delete "ann" and substitute --arm--therefor.

col. 4, line 46, before "follower," delete "ann" and substitute --arm--therefor.

col. 4, line 48, before "teeth 20b-d." delete "ann" and substitute --arm--therefor.

col. 4, line 50, before "rotation of the," delete "ann" and substitute --arm--therefor.

col. 4, line 65, before "follower," delete "ann" and substitute --arm--therefor.

col. 5, line 17, before "member," delete "ann" and substitute --arm--therefor.

UNITED STATES PATENT AND TRADEMARK OFFICE
CERTIFICATE OF CORRECTION

PATENT NO. : 5,351,568

DATED : October 4, 1994

INVENTOR(S) : Leon G. Feterl

It is certified that error appears in the above-indentified patent and that said Letters Patent is hereby corrected as shown below:

col. 5, line 18, before "follower," delete "ann" and substitute --arm--therefor.

Signed and Sealed this

Third Day of January, 1995

BRUCE LEHMAN

*Attest:*

*Attesting Officer*  *Commissioner of Patents and Trademarks*

UNITED STATES PATENT AND TRADEMARK OFFICE
CERTIFICATE OF CORRECTION

PATENT NO. : 5,351,568

DATED : October 4, 1994

INVENTOR(S) : Feterl

Page 1 of 4

It is certified that error appears in the above-indentified patent and that said Letters Patent is hereby corrected as shown below:

IN THE ABSTRACT:  line 7, after "follower" delete "ann" and substitute --arm-- therefor.

line 15, after "follower" and "linking" delete "ann" and substitute --arm-- therefor col. 1, line 61, after "follower" delete "ann" and substitute --arm-- therefor.

col. 1, line 67, after "to" delete "title" and insert "the" before "second"

col. 2, line 3, after "follower" delete "ann" and substitute --arm-- therefor.

col. 2, line 5, after "pin and the" delete "ann" and substitute --arm-- therefor.

col. 2, line 66, after "follower" delete "ann" and substitute --arm-- therefor.

col. 2, line 67, after "elongate" delete "ann" and substitute --arm-- therefor.

col. 3, line 3, after "follower" delete "ann" and substitute --arm-- therefor.

col. 3, line 31, after "Each" delete "ann" and substitute --arm-- therefor.

UNITED STATES PATENT AND TRADEMARK OFFICE
CERTIFICATE OF CORRECTION

PATENT NO. : 5,351,568

DATED : October 4, 1994

INVENTOR(S) : Feterl

It is certified that error appears in the above-identified patent and that said Letters Patent is hereby corrected as shown below:

col. 3, line 33, after "50, an" delete "ann" and substitute --arm-- therefor.

col. 3, line 33, after "an" delete "ann" and insert "arm"

col. 3, line 35, after "the" delete "ann" and substitute "arm"

col. 3, line 36, after "Fig. 2" delete "ann" and substitute --arm-- therefor.

col. 3, line 37, after "means of an" delete "ann" and substitute --arm-- therefor.

col. 5, line 38, after "between the" delete "ann" and substitute --arm-- therefor.

col. 3, line 40, after "each" delete "ann" and substitute --arm-- therefor.

col. 3, line 41, after "arm to" delete "ann" and substitute --arm-- therefor.

col. 3, line 44, after "associated with" delete "ann" and substitute --arm-- therefor.

col. 4, line 5, after "lobe 26" delete "ann" and substitute --arm-- therefor.

col. 4, line 10, after "now" delete "engage" and substitute --engaged-- therefor.

UNITED STATES PATENT AND TRADEMARK OFFICE
CERTIFICATE OF CORRECTION

PATENT NO. : 5,351,568
DATED : October 4, 1994
INVENTOR(S) : Feterl

It is certified that error appears in the above-indentified patent and that said Letters Patent is hereby corrected as shown below:

col. 4, line 10, after "That is" delete "ann" and substitute --arm-- therefor.

col. 4, line 19, after "defined in" delete "pan" and substitute --part-- therefor.

col. 4, line 29, after "rotates" delete "Ann" and substitute --Arm-- therefor.

col. 4, line 36, after "follower" and "28 and follower" delete "ann" and substitute --arm-- therefor.

col. 4, line 38, after "motion of" delete "ann" and substitute --arm-- therefor.

col. 4, line 41, after "teeth 20a-c." delete "ann" and substitute --arm-- therefor.

col. 4, line 46, after "follower" delete "ann" and substitute --arm-- therefor.

col. 4, line 48, after "teeth 20b-d." delete "Ann" and substitute --arm-- therefor.

col. 4, line 50, after "rotation of the" delete "ann" and substitute --arm-- therefor.

col. 4, line 65, after "follower" delete "ann" and substitute --arm-- therefor.

UNITED STATES PATENT AND TRADEMARK OFFICE
CERTIFICATE OF CORRECTION

PATENT NO. : 5,351,568

DATED : October 4, 1994

INVENTOR(S) : Feterl

It is certified that error appears in the above-identified patent and that said Letters Patent is hereby corrected as shown below:

col. 5, line 17, after "member" delete "ann" and substitute --arm-- therefor.

col. 5, line 18, after "follower" delete "ann" and substitute --arm-- therefor.

This certificate supersedes Certificate of Correction issued January 3, 1995.

Signed and Sealed this

Twenty-fourth Day of January, 1995

Attest:

BRUCE LEHMAN

Attesting Officer      Commissioner of Patents and Trademarks